United States Patent
Chae

(10) Patent No.: US 11,443,747 B2
(45) Date of Patent: Sep. 13, 2022

(54) ARTIFICIAL INTELLIGENCE APPARATUS AND METHOD FOR RECOGNIZING SPEECH OF USER IN CONSIDERATION OF WORD USAGE FREQUENCY

(71) Applicant: LG Electronics Inc., Seoul (KR)

(72) Inventor: Jonghoon Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 16/653,120

(22) Filed: Oct. 15, 2019

(65) Prior Publication Data
US 2020/0043498 A1 Feb. 6, 2020

(30) Foreign Application Priority Data
Sep. 18, 2019 (KR) .................... 10-2019-0114453

(51) Int. Cl.
| | |
|---|---|
| G10L 15/26 | (2006.01) |
| G06F 17/18 | (2006.01) |
| G10L 15/22 | (2006.01) |
| G10L 15/065 | (2013.01) |

(52) U.S. Cl.
CPC .............. *G10L 15/26* (2013.01); *G06F 17/18* (2013.01); *G10L 15/065* (2013.01); *G10L 15/22* (2013.01); *G10L 2015/223* (2013.01)

(58) Field of Classification Search
CPC ....... G10L 15/065; G10L 15/07; G10L 15/26; G10L 15/22; G10L 17/18; G10L 2015/223; G06F 17/18
See application file for complete search history.

(56) References Cited

U.S. PATENT DOCUMENTS

| | | | | |
|---|---|---|---|---|
| 5,241,619 A | * | 8/1993 | Schwartz | G10L 15/08 704/200 |
| 5,802,488 A | * | 9/1998 | Edatsune | G10L 13/00 704/231 |
| 7,505,969 B2 | * | 3/2009 | Musgrove | G06F 16/958 707/999.005 |
| 8,150,823 B2 | * | 4/2012 | Hamano | G06F 21/606 707/705 |
| 8,521,526 B1 | * | 8/2013 | Lloyd | G10L 15/01 704/236 |
| 8,862,467 B1 | * | 10/2014 | Casado | G10L 15/22 704/235 |
| 9,361,289 B1 | * | 6/2016 | Jampani | G06F 16/3344 |
| 9,514,747 B1 | * | 12/2016 | Bisani | G10L 15/08 |
| 10,210,860 B1 | * | 2/2019 | Ward | G06N 3/084 |
| 10,387,568 B1 | * | 8/2019 | Cheng | G06F 16/24578 |

(Continued)

FOREIGN PATENT DOCUMENTS

JP 2020089641 A * 6/2020

OTHER PUBLICATIONS

Google Translation of JP 2020-089641 (Year: 2020).*

*Primary Examiner* — Eric Yen
(74) *Attorney, Agent, or Firm* — Fish & Richardson P.C.

(57) ABSTRACT

Disclosed herein is an artificial intelligence apparatus for recognizing speech of a user including a microphone and a processor configured to obtain, via the microphone, speech data including speech of a user, determine a frequency weight for each word using a speech recognition log, generate a speech recognition result corresponding to the speech data using the frequency weight, and perform control corresponding to the speech recognition result.

18 Claims, 10 Drawing Sheets

(56) References Cited

U.S. PATENT DOCUMENTS

| | | | |
|---|---|---|---|
| 10,609,037 B2* | 3/2020 | Jackson | H04L 63/1408 |
| 2002/0095294 A1* | 7/2002 | Korfin | G10L 15/22 |
| | | | 704/275 |
| 2005/0131699 A1* | 6/2005 | Fukada | G10L 15/06 |
| | | | 704/270 |
| 2005/0192802 A1* | 9/2005 | Robinson | G06V 30/268 |
| | | | 704/240 |
| 2006/0116997 A1* | 6/2006 | Yu | G10L 15/04 |
| 2006/0173683 A1* | 8/2006 | Roth | G10L 15/183 |
| | | | 704/251 |
| 2007/0083374 A1* | 4/2007 | Bates | G10L 15/197 |
| | | | 704/E15.023 |
| 2007/0129942 A1* | 6/2007 | Ban | G06F 40/169 |
| | | | 704/235 |
| 2008/0208582 A1* | 8/2008 | Gallino | G10L 15/063 |
| | | | 704/251 |
| 2008/0270138 A1* | 10/2008 | Knight | G06F 16/434 |
| | | | 704/E15.045 |
| 2009/0150156 A1* | 6/2009 | Kennewick | G10L 15/00 |
| | | | 704/257 |
| 2010/0114571 A1* | 5/2010 | Nagatomo | G06F 16/433 |
| | | | 704/235 |
| 2011/0015926 A1* | 1/2011 | Kim | G10L 15/26 |
| | | | 704/235 |
| 2011/0029301 A1* | 2/2011 | Han | G09G 5/14 |
| | | | 704/9 |
| 2011/0161077 A1* | 6/2011 | Bielby | G10L 15/32 |
| | | | 704/231 |
| 2011/0231191 A1* | 9/2011 | Miyazaki | G01C 21/3608 |
| | | | 704/243 |
| 2012/0059658 A1* | 3/2012 | Sejnoha | G10L 15/26 |
| | | | 704/270 |
| 2013/0060561 A1* | 3/2013 | O'Dell | G06F 40/126 |
| | | | 704/9 |
| 2013/0325448 A1* | 12/2013 | Levien | G10L 19/00 |
| | | | 704/201 |
| 2014/0088961 A1* | 3/2014 | Woodward | G10L 15/22 |
| | | | 704/235 |
| 2014/0278407 A1* | 9/2014 | Chelba | G10L 15/197 |
| | | | 704/235 |
| 2014/0343935 A1* | 11/2014 | Jung | G10L 15/08 |
| | | | 704/233 |
| 2015/0325238 A1* | 11/2015 | Dai | G10L 15/197 |
| | | | 704/257 |
| 2016/0005402 A1* | 1/2016 | Schubert | G10L 21/04 |
| | | | 704/235 |
| 2016/0098393 A1* | 4/2016 | Hebert | G06F 16/3344 |
| | | | 704/9 |
| 2016/0267902 A1* | 9/2016 | Hwang | G06F 40/253 |
| 2017/0229115 A1* | 8/2017 | Lee | G10L 15/14 |
| 2017/0357632 A1* | 12/2017 | Pagallo | G06F 3/04886 |
| 2018/0173494 A1* | 6/2018 | Choi | G06N 20/00 |
| 2019/0228763 A1* | 7/2019 | Czarnowski | G06N 3/063 |
| 2019/0258717 A1* | 8/2019 | Williams | G06F 40/289 |
| 2020/0243092 A1* | 7/2020 | Yabuuchi | G10L 15/02 |
| 2020/0357392 A1* | 11/2020 | Zhou | G10L 15/16 |
| 2020/0402516 A1* | 12/2020 | Trim | G01S 5/28 |

* cited by examiner

ARTIFICIAL INTELLIGENCE APPARATUS AND METHOD FOR RECOGNIZING SPEECH OF USER IN CONSIDERATION OF WORD USAGE FREQUENCY

CROSS-REFERENCE TO RELATED APPLICATIONS

This application claims priority to Korean Patent Application No. 10-2019-0114453 filed on Sep. 18, 2019 in Korea, the entire contents of which is hereby incorporated by reference in its entirety.

BACKGROUND

The present disclosure relates to an artificial intelligence apparatus and method for recognizing speech of a user in consideration of a word usage frequency, and more particularly, to an artificial intelligence apparatus and method for recognizing speech of a user by determining words included in speech data in consideration of a word usage frequency.

Recently, apparatuses for receiving sound and performing control are increasing. An apparatus such as an artificial intelligence speaker or a smartphone recognizes speech uttered by a user and performs control corresponding to a recognition result or provides a response.

In order to recognize speech of a user, it is necessary to convert sound data including the speech of the user into text and to analyze the intent of the converted text. When the sound data is converted into text, phonemes included in the sound data are recognized and a word corresponding to the recognized phonemes is determined.

When the word is determined based only on the result of recognizing the phonemes, since the speech of the user is incorrectly recognized due to homonym, wrong pronunciation or external factors such as noise, the word corresponding to the recognized phonemes is determined based on peripheral words or contexts.

When the sound data including the speech of the user is accurately converted into text, it is possible to more accurately predict intent information of the speech of the user. Therefore, it is important to accurately determine the words included in the sound data.

SUMMARY

The present disclosure is to provide an artificial intelligence apparatus and method for recognizing speech of a user with higher accuracy in consideration of a word usage frequency of the user when the speech of the user is recognized.

According to an embodiment, provided is an artificial intelligence apparatus and method for obtaining speech data, determining a frequency weight for each word using a speech recognition log, and generating a speech recognition result corresponding to speech data using the frequency weight.

According to an embodiment, provided is an artificial intelligence apparatus and method for calculating a word-by-word probability for each section in the speech data, calibrating the word-by-word probability by multiplying the word-by-word probability by the frequency weight, converting the speech data into the text by selecting words having a highest calibrated word-by-word probability for each section, and generating a speech recognition result using the converted text.

According to an embodiment, provided is an artificial intelligence apparatus and method for determining a private frequency weight of each word using a private speech recognition log, determining a public frequency weight of each word using a public speech recognition log, and calibrating a word-by-word probability using the private frequency weight and the public frequency weight.

According to an embodiment, provided is an artificial intelligence apparatus and method for determining utterance situation information, calibrating a frequency weight using the utterance situation information, and calibrating a word-by-word probability using the calibrated frequency weight.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Figure 1:
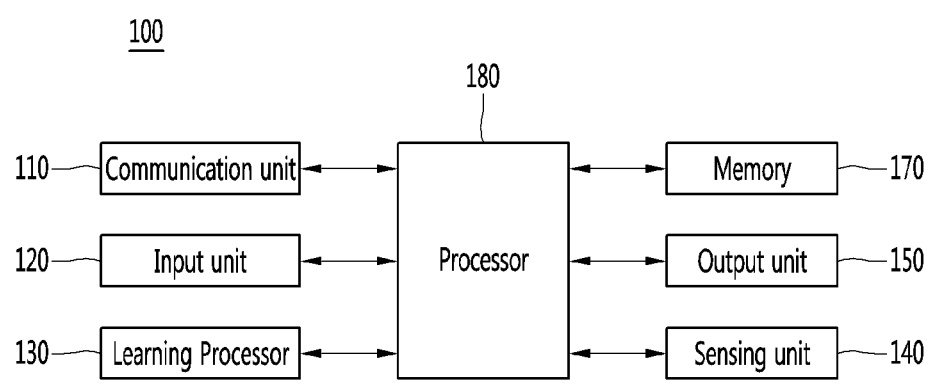
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
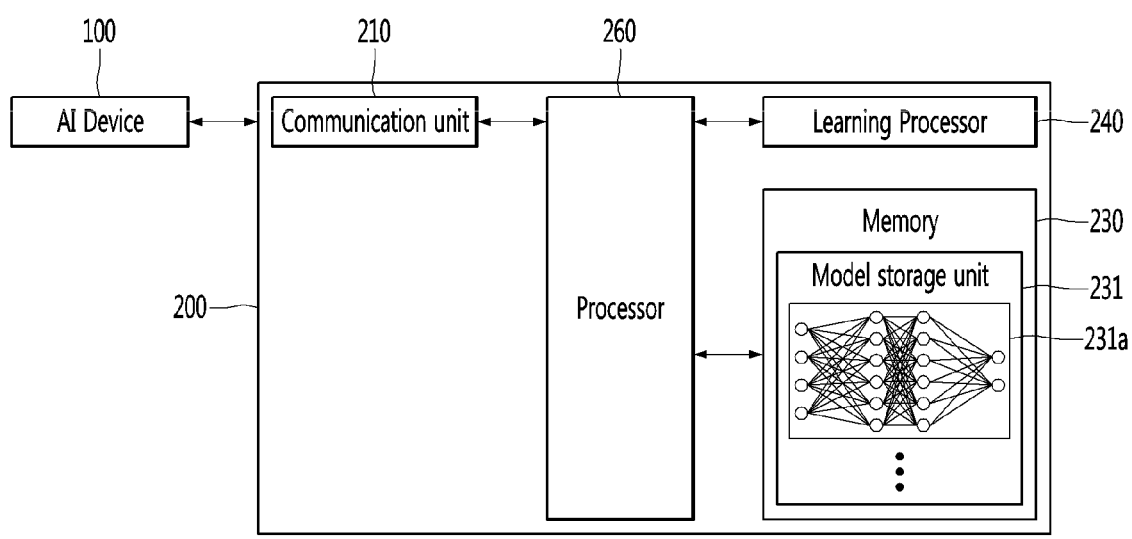
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
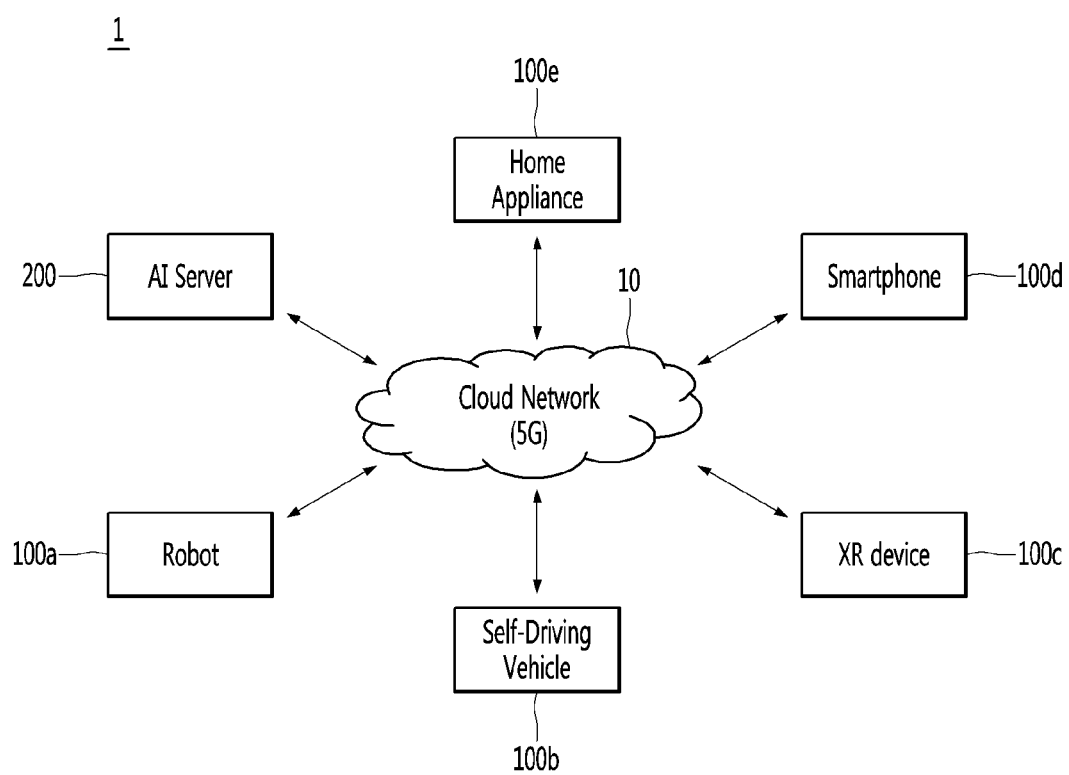
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
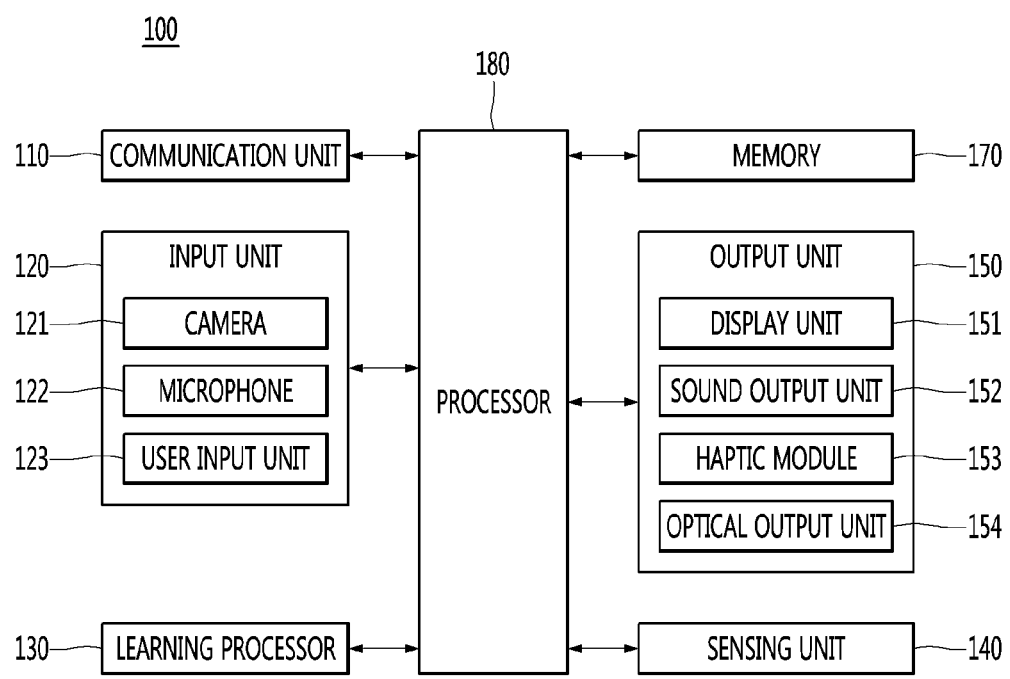
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication unit 110 may also be referred to as a communication circuit.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
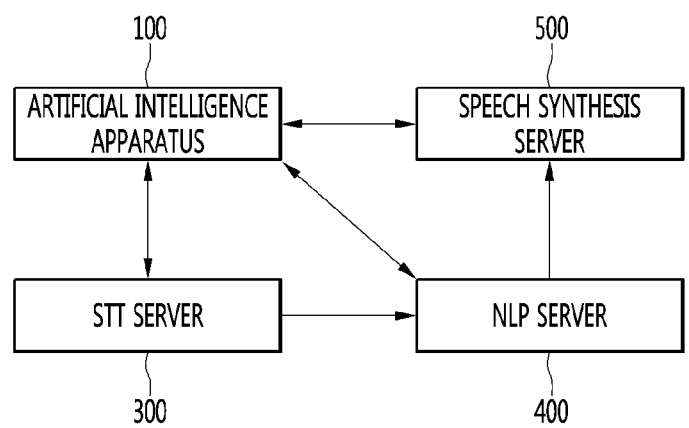
FIG. 5 is a block diagram illustrating an AI system according to an embodiment of the present disclosure.

FIG. 5 is a block diagram illustrating an AI system 1 according to an embodiment of the present disclosure.

Referring to FIG. 5, the AI system 1 may include an AI apparatus 100, a speech-to-text (STT) server 300, a natural language processing (NLP) server 400 and a speech synthesis server 500.

The AI apparatus 100 may transmit speech data to the STT server 300. The STT server 300 may convert the speech data received from the AI apparatus 100 into text data. The NLP server 400 may receive text data from the STT server 300. The NLP server 400 may analyze the intent of the text data based on the received text data. The NLP server 400 may transmit intent analysis information indicating the result of analyzing the intent to the AI apparatus 100 or the speech synthesis server 500. The speech synthesis server 500 may generate a synthesis speech reflecting the intent of the user based on the intent analysis information and transmit the generated synthesis speech to the AI apparatus 100.

The STT server 300 may increase accuracy of speech-to-text conversion using a language model. The language model may mean a model capable of calculating a probability of a sentence or calculating a probability of outputting a next word when previous words are given. For example, the language model may include probabilistic language models such as a unigram model, a bigram model and an N-gram model. The unigram is a model that assumes that all words are completely independent of each other and calculates a probability of a word sequence as a product of probabilities of words. The bigram model is a model that assumes that use of a word depends on only one previous word. The N-gram model is a model that assume that use of a word depends on previous (n−1) words.

That is, the STT server 300 may determine whether the converted text data is appropriately converted from the speech data using a language model, thereby increasing accuracy of conversion from the speech data into the text data.

The NLP server 400 may sequentially perform a morpheme analysis step, a syntax analysis step, a speech-act analysis step, an interaction processing step with respect to text data, thereby generating intent analysis information.

The morpheme analysis step refers to a step of classifying the text data corresponding to the speech uttered by the user into morphemes as a smallest unit having a meaning and determining the part of speech of each of the classified morphemes. The syntax analysis step refers to a step of classifying the text data into a noun phrase, a verb phrase, an adjective phrase, etc. using the result of the morpheme analysis step and determining a relation between the classified phrases. Through the syntax analysis step, the subject, object and modifier of the speech uttered by the user may be determined. The speech-act analysis step refers to a step of analyzing the intent of the speech uttered by the user using the result of the syntax analysis step. Specifically, the speech-act step refers to a step of determining the intent of a sentence such as whether the user asks a question, makes a request, or expresses simple emotion. The interaction processing step refers to a step of determining whether to answer the user's utterance, respond to the user's utterance or question about more information, using the result of the speech-act step.

The NLP server 400 may generate intent analysis information including at least one of the answer to, a response to, or a question about more information on the intent of the user's utterance, after the interaction processing step.

Meanwhile, the NLP server 400 may receive the text data from the AI apparatus 100. For example, when the AI apparatus 100 supports the speech-to-text conversion function, the AI apparatus 100 may convert the speech data into the text data and transmit the converted text data to the NLP server 400.

The speech synthesis server 500 may synthesize prestored speech data to generate a synthesized speech. The speech synthesis server 500 may record the speech of the user selected as a model and divide the recorded speech into syllables or words. The speech synthesis server 500 may store the divided speech in an internal or external database in syllable or word units.

The speech synthesis server 500 may retrieve syllables or words corresponding to the given text data from the database and synthesize the retrieved syllables or words, thereby generating the synthesized speech.

The speech synthesis server 500 may store a plurality of speech language groups respectively corresponding to a plurality of languages. For example, the speech synthesis server 500 may include a first speech language group recorded in Korean and a second speech language group recorded in English.

The speech synthesis server 500 may translate text data of a first language into text of a second language and generate a synthesized speech corresponding to the translated text of the second language using the second speech language group.

The AI system 1 may further include an AI server 200. The AI server 200 may learn at least one of an STT engine used in the STT server 300, an NLP engine used in the NLP server 400 or a speech synthesis engine used in the speech synthesis server 500. That is, at least one of the STT server 300, the NLP server 400 or the speech synthesis server 500 may use models or engines trained in the AI server 200.

Although the AI apparatus 100, the STT server 300, the NLP server 400 and the speech synthesis server 500 are shown as being divided in FIG. 5, the present disclosure is not limited thereto. In one embodiment, some of the AI server 200, the STT server 300, the NLP server 400 or the speech synthesis server 500 may be configured as one server. In one embodiment, some of the STT server 300, the NLP server 400 or the speech synthesis server 500 may be included in the AI apparatus 100. This means that the AI apparatus 100 performs the function of the STT server 300, the NLP server 400 or the speech synthesis server 500.

Figure 6:
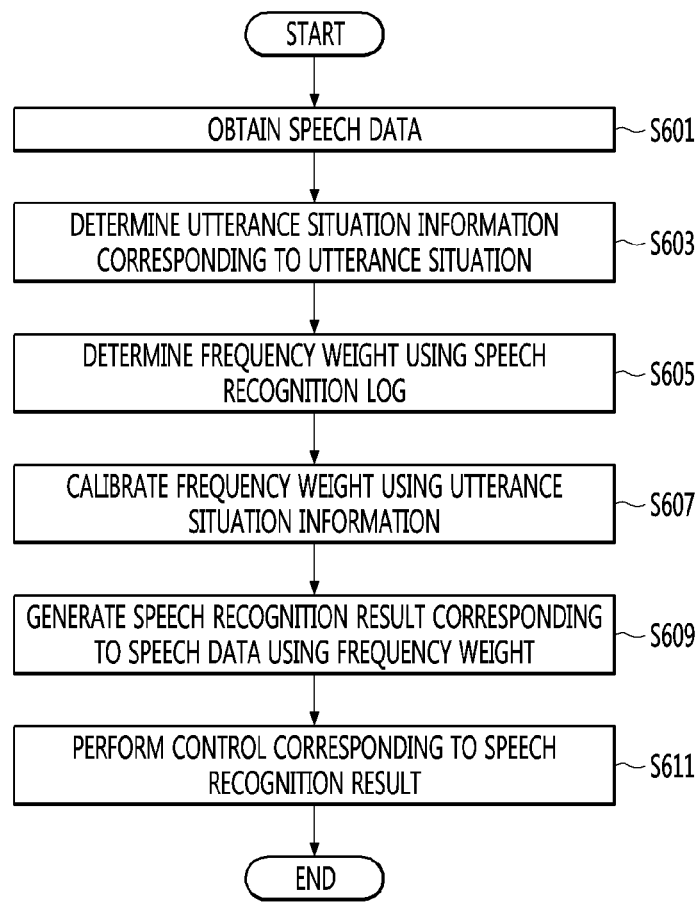
FIG. 6 is a flowchart illustrating a method of recognizing speech of a user according to an embodiment of the present disclosure.

FIG. 6 is a flowchart illustrating a method of recognizing speech of a user according to an embodiment of the present disclosure.

Referring to FIG. 6, the processor 180 of the artificial intelligence apparatus 100 obtains speech data including speech of a user (S601).

The processor 180 may obtain the speech data via the microphone 122 or receive the speech data from an external apparatus (not shown) via the communication unit 110.

The speech data may be obtained by converting a sound wave including the speech of the user into a digital signal. For example, the speech data may be an audio file in various formats such as pulse code modulation (PCM), wave or mp3.

The speech of the user may be uttered speech including a command for controlling the artificial intelligence apparatus 100 and a query for searching for information.

The processor 180 may remove noise from the obtained speech data as preprocessing. The processor 180 may directly generate speech data, from which noise is removed, using a noise removal engine or a noise removal filter or transmit the sound data to the artificial intelligence server 200 and receive the speech data, from which noise is removed. In addition, the volume of the speech data may be controlled according to a predetermined level. Control of the volume of the speech data may be regarded as part of the preprocessing. Hereinafter, the speech data may mean the speech data, from which noise is removed via preprocessing.

In addition, the processor 180 of the artificial intelligence apparatus 100 determines utterance situation information corresponding to an utterance situation (S603).

The utterance situation may mean a situation at the time when the user utters the uttered speech of the user included in the speech data received by the artificial intelligence apparatus 100. The utterance situation information may indicate the utterance situation and include the type of the artificial intelligence apparatus, an installation place of the artificial intelligence apparatus, an utterance place of the user, a main user, an uttering user, a device operation status, etc.

Examples of the type of the artificial intelligence apparatus include an artificial intelligence speaker, an artificial intelligence TV, an artificial intelligence refrigerator, an artificial intelligence vehicle, an artificial intelligence phone, an artificial intelligence cleaner, an artificial intelligence robot, etc. The device operation status may include operation statuses of external artificial intelligence apparatuses, external IoT devices, and external apparatuses as well as the artificial intelligence apparatus 100. For example, if the artificial intelligence apparatus is an artificial intelligence TV, the device operation status may include not only the operation status of the artificial intelligence TV but also the operation status of external apparatuses such as a washing machine, a refrigerator or an air conditioner. To this end, the artificial intelligence apparatus 100 may communicate with external devices via the communication unit 110 and receive operation status information from the external devices.

The speech uttered by the user is closely associated with the type of the artificial intelligence apparatus for obtaining speech data, an installation place of the artificial intelligence apparatus, an utterance location of a user (or a location of an uttering user), an uttering user, a device operation status, etc. Accordingly, the utterance situation information may provide meaningful information when recognizing speech uttered by the user. For example, when the artificial intelligence apparatus is an artificial intelligence TV, the speech uttered by the user may generally be speech for controlling the function of the TV. For example, when the artificial intelligence apparatus is installed at a front door, the speech uttered by the user may generally control a front door or an indoor lighting. For example, when the artificial intelligence apparatus is an artificial intelligence TV and a washing machine is in operation, the speech uttered by the user may be generally speech for controlling the TV or speech for questioning about operation of the washing machine.

The processor 180 may determine the type of the artificial intelligence apparatus from device information stored in the memory 170.

The processor 180 may determine the installation information of the artificial intelligence apparatus based on the location information stored in the memory 170. The location information of the artificial intelligence apparatus may be set by the user or may be determined via interaction with external devices using a triangulation method.

The processor 180 may determine the utterance location of the user using at least one of the installation location of the artificial intelligence apparatus, a relative location of the user, and space information. The relative location of the user may be determined via interaction with the external devices using a triangulation method. The space information may mean information on a space where the artificial intelligence apparatus is installed, and may include map data.

The processor 180 may determine a currently uttering user based on voiceprint analysis of the obtained speech data and user account information. In addition, the processor 180 may determine a main user using a log of uttering users.

The processor 180 may determine an operation status of the artificial intelligence apparatus 100 based on operation performed currently, and receive information on the operation statuses of the external devices from the external devices via the communication unit 110, and determine the operation statuses of the external devices.

In addition, the processor 180 of the artificial intelligence apparatus 100 determines a frequency weight using a speech recognition log (S605).

The speech recognition log may mean a log of speech recognition results and the frequency weight may be determined for each word or for each vocabulary. Accordingly, since the frequency weight is determined for each word or for each vocabulary, one frequency weight set may be configured. Hereinafter, determining the frequency weight may mean determining the frequency weight set.

The speech recognition log may be a log of speech recognition results performed by the artificial intelligence apparatus 100 with the user. Further, the speech recognition log may include a log of speech recognition results performed by the same types of other artificial intelligence apparatuses with other users. In this case, the former may be referred to as a first speech recognition log or a private speech recognition log and the latter may be referred to as a second speech recognition log or a public speech recognition log.

Since the first speech recognition log and the second speech recognition log are collected from the same type of artificial intelligence apparatuses, it may be expected that similar vocabularies are included even in the speeches uttered by different users. Since the first speech recognition log is a speech recognition log of a user who actually uses the artificial intelligence apparatus 100, the usage vocabulary distribution of the user may be reflected more accurately as compared to the second speech recognition log which is the speech recognition record of the other users who use the same type of artificial intelligence apparatuses.

In one embodiment, the processor 180 may determine a single frequency weight without distinguishing between the first speech recognition log and the second speech recognition log. That is, the processor 180 may determine one frequency weight for each word or for each vocabulary using the first speech recognition log and the second speech recognition log.

In one embodiment, the processor 180 may determine a first frequency weight or a private frequency weight using the first speech recognition log and determine a second frequency weight or a public frequency weight using the second speech recognition log. That is, the processor 180 may determine two frequency weights for each word or for each vocabulary using the first speech recognition log and the second speech recognition log.

The processor 180 may increase the frequency weight of a word or vocabulary included in the speech recognition log. That is, since the word or vocabulary frequently included in the speech recognition log has a high usage frequency, the frequency weight may be set high. However, if the frequency weight of the word or vocabulary included in the speech recognition log is only increased, the frequency weight may be set high overall. In order to prevent this problem, the processor 180 may increase the frequency weight of the word or vocabulary included in the speech recognition log and then normalize the frequency weight set.

In addition, the processor 180 of the artificial intelligence apparatus 100 calibrate the determined frequency weight using the determined utterance situation information (S607).

The processor 180 may calibrate the frequency weight of each word or vocabulary based on individual information included in the utterance situation information. As described above, the utterance situation information may include the type of the artificial intelligence apparatus, the installation place of the artificial intelligence apparatus, the utterance place of the user, an uttering user, a device operation status, etc.

The processor 180 may calibrate the frequency weight for each word or vocabulary using the speech recognition log corresponding to the utterance situation information. That is, the processor 180 may calibrate the frequency weights of the words corresponding to the utterance situation information. For example, if the type of the artificial intelligence apparatus is a refrigerator, the processor 180 may increase the frequency weights corresponding to the words or vocabularies related to usage of the refrigerator. For example, if a washing machine is in operation, the processor 180 of the artificial intelligence apparatus 100 may increase the frequency weights corresponding to the words or vocabularies related to usage of the washing machine.

Calibrating the determined frequency weight may refer to determining a calibration weight for calibrating the determined frequency weight and multiplying the frequency weight by the calibration weight. That is, the processor 180 may determine the calibration weight for calibrating the frequency weight for each word or for each vocabulary and multiply the frequency weight for each word or for each vocabulary by the calibration weight. Since the calibration weight is also determined for each word or for each vocabulary, a calibration weight set may be configured.

In calibration of the frequency weight for each word or for each vocabulary, the processor 180 may normalize the frequency weight set, by calibrating the frequency weights corresponding to some word or vocabularies.

Even if the frequency weight determined for each word or for each vocabulary does not have a significant value due to a small amount of speech recognition results, it is possible to obtain a minimum frequency weight for each word or for each vocabulary corresponding to the utterance situation, by calibrating the frequency weight from the utterance situation information. In this perspective, the calibration value or calibration weight of the frequency weight may function as an initial value of the frequency weight based on the utterance situation information.

In addition, the processor 180 of the artificial intelligence apparatus 100 generates a speech recognition result (first speech recognition result) corresponding to the speech data using the determined frequency weight (S609).

The speech recognition result of the speech data may include text converted from the speech included in the speech data and meaning or intent information corresponding to the converted text.

The processor 180 may convert the speech data into text using an STT engine, generate intent information corresponding to the converted text using an NLP engine, and generate a speech recognition result corresponding to the generated intent information. When the speech data is converted into the text, the processor 180 may calculate a word-by-word probability corresponding to each section of the speech data, convert the speech data into text based on the calculated probability, and generate a speech recognition result based on the converted text. In particular, the processor 180 may convert the speech data into text by combining words having a highest probability.

When the speech data is converted into text, the processor 180 may recognize phonemes from the speech data using an acoustic model and convert the recognized phonemes into words using a language model. When the recognized phonemes are converted into the words, the processor 180 may calculate a word-by-word probability corresponding to each section of the speech data using the language model, multiply the calculated word-by-word probability by the determined word-by-word frequency weight, and convert the speech data into text by combining words having a highest word-by-word probability multiplied by the frequency weight.

The processor 180 determines the word-by-word probability corresponding to a specific section based on determined peripheral words using the language model. However, this does not effectively reflect words or vocabularies which are frequently used by the user. The processor 180 may calibrate (correct) the determined word-by-word probability using the language model, by multiplying the word-by-word probability determined using the language model by the word-by-word frequency weight determined using the utterance situation information and the speech recognition log, and convert the speech data into text by selecting a word having a highest calibrated word-by-word probability.

In addition, the processor 180 of the artificial intelligence apparatus 100 performs control corresponding to the generated speech recognition result (S611).

If the speech recognition result is a control command for controlling the artificial intelligence apparatus 100 or the external apparatus (not shown), the processor 180 may perform control corresponding to the control command. In particular, if the control command is a command for controlling the external apparatus (not shown), the processor 180 may generate a control signal for controlling the external apparatus (not shown) according to the control command and transmit the control signal to the external apparatus (not shown) via the communication unit 110. In addition, the processor 180 may output feedback on the control command to the user via the output unit 150 or transmit an output signal for outputting feedback on the control command to a user terminal (not shown) via the communication unit 110.

Similarly, if the speech recognition result is a query for requesting information, the processor 180 may generate response information corresponding to the query via the Internet. In addition, the processor 180 may output the generated response information via the output unit 150 or transmit an output signal for outputting the response information to the user terminal (not shown) via the communication unit 110.

The processor 180 may generate response speech for outputting the response information and audibly output the response speech via the sound output unit 152. Specifically, the processor 180 may generate a response sentence using a natural language generation (NLG) scheme, convert the generated response sentence into the response speech using a text-to-speech (TTS) engine, and output the converted response speech via the sound output unit 152.

The steps shown in FIG. 6 may be repeatedly performed and thus the artificial intelligence apparatus 100 may repeatedly perform interaction with the user via speech recognition.

Figure 7:
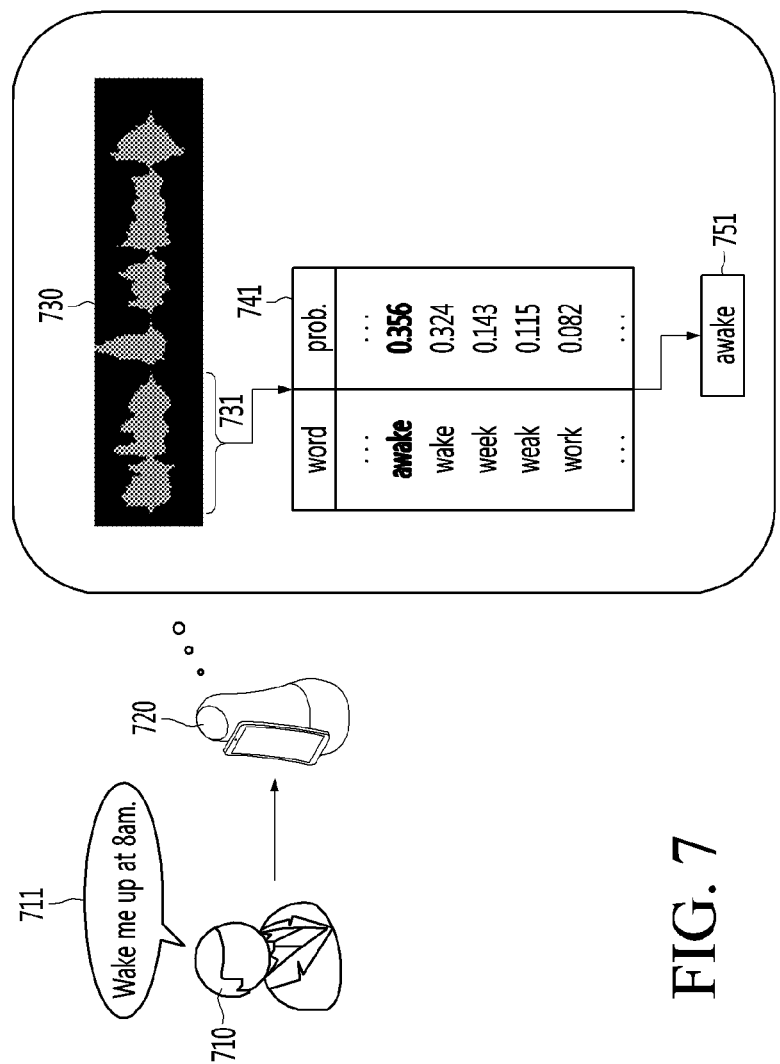
FIG. 7 is a view illustrating an example of recognizing speech of a user according to an embodiment of the present disclosure.

FIG. 7 is a view illustrating an example of recognizing speech of a user according to an embodiment of the present disclosure.

Referring to FIG. 7, when a user 710 utters "Wake me up at 8 am." 711, the artificial intelligence apparatus 720 obtains speech data 730 corresponding to the uttered speech 711 of the user 710.

The artificial intelligence apparatus 720 may determine phonemes with respect to the obtained speech data 730 using an acoustic model and determine a word from the recognized phonemes using a language model.

The artificial intelligence apparatus 720 may determine a probability 741 of each word in a first section 731 using a language model, when the word of the section 731 corresponding to "wake" in the uttered speech 711 of the user is determined. A probability of each word in a certain section may be simply referred to as a lexicon. In the first lexicon 741 of a first section 731 corresponding to "wake", the probability of a word "awake" is 0.356, the probability of a word "wake" is 0.324, the probability of a word "week" is 0.143, the probability of a word "weak" is 0.115, and the probability of a word "work" is 0.082.

Since the probability of the "awake" is 0.356 and is highest in the first lexicon 741 of the first section 731, the artificial intelligence apparatus 720 may inaccurately determine the word of the first section 731 as "awake" 751.

Figure 8:
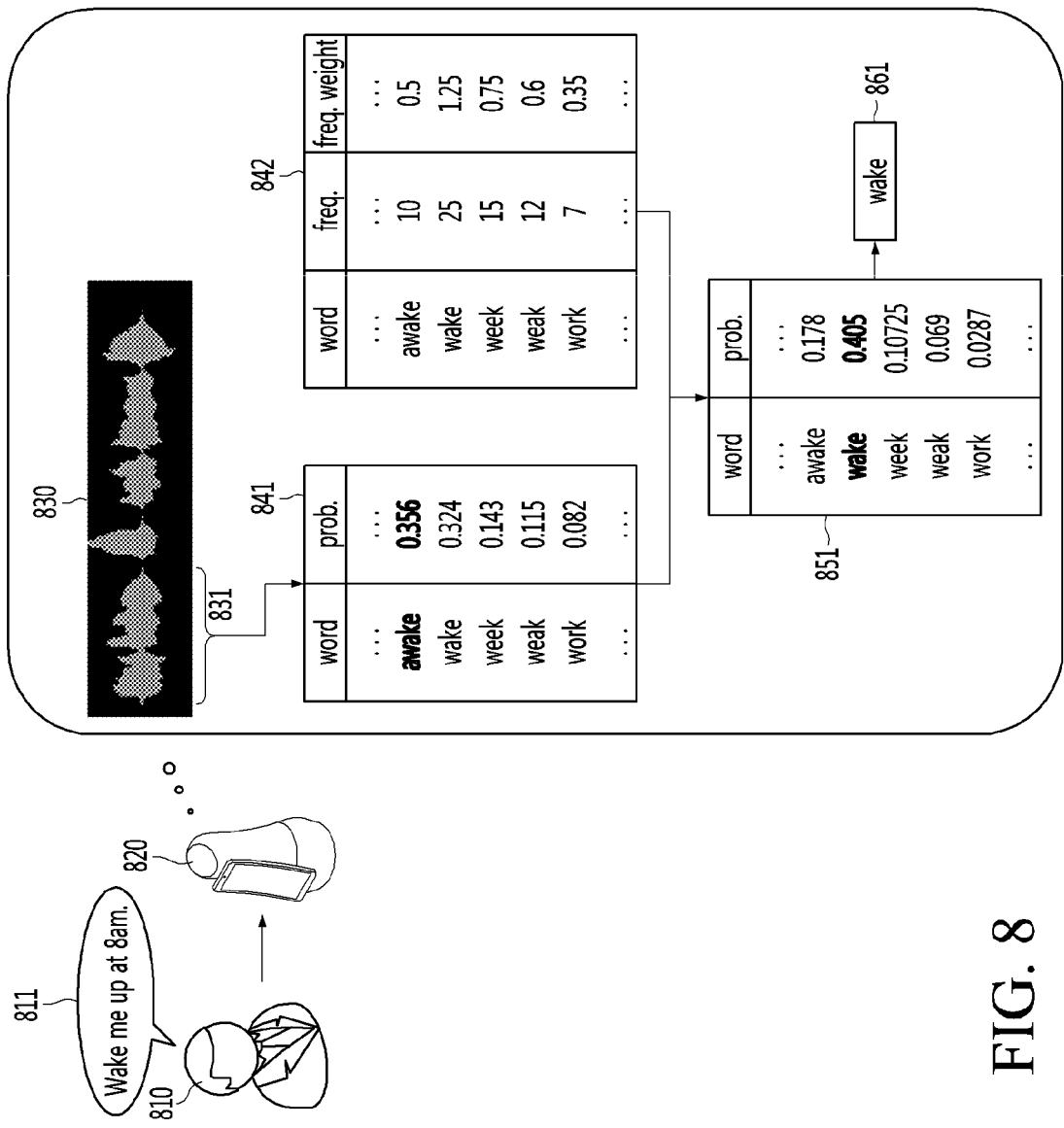
FIG. 8 is a view illustrating an example of recognizing speech of a user according to an embodiment of the present disclosure.

FIG. 8 is a view illustrating an example of recognizing speech of a user according to an embodiment of the present disclosure.

Referring to FIG. 8, similarly to FIG. 7, when a user 810 utters "Wake me up at 8 am." 811, the artificial intelligence apparatus 820 obtains speech data 830 corresponding to the uttered speech 811 of the user 810.

The artificial intelligence apparatus 820 may determine phonemes with respect to the obtained speech data 830 using an acoustic model and determine a word from the recognized phonemes using a language model.

The artificial intelligence apparatus 820 may determine a probability 841 of each word in a first section 831 using a language model, when the word of the section 831 corresponding to "wake" in the uttered speech 811 of the user is determined. For example, according to a first lexicon 841 of a first section 731 corresponding to "wake", the probability of a word "awake" is 0.356, the probability of a word "wake" is 0.324, the probability of a word "week" is 0.143, the probability of a word "weak" is 0.115, and the probability of a word "work" is 0.082.

The artificial intelligence apparatus 820 may determine a usage frequency and a frequency weight 842 of each word using a speech recognition log. For example, the artificial intelligence apparatus 820 may determine the frequency weight of the word "awake" as 0.5, determine the frequency weight of the word "wake" as 1.25, determine the frequency weight of the word "week" as 0.75, determine the frequency weight of the word "weak as 0.6, and determine the frequency weight of the word "work" as 0.35.

The artificial intelligence apparatus 820 may determine a frequency weight in proportion to the usage frequency of each word, but the present disclosure is not limited thereto. That is, the artificial intelligence apparatus 820 may determine the frequency weight higher as the usage frequency increases, by determining the frequency weight from the usage frequency of each word using a predetermined monotonic increasing function.

The artificial intelligence apparatus 820 may generate a second lexicon 851 corresponding to the first section 831 in consideration of the first lexicon 841 corresponding to the first section 831 and the frequency weight 842, in order to determine the word of the first section 831. For example, according to the second lexicon 851, the probability of the word "awake" is 0.178, the probability of the word "wake" is 0.405, the probability of the word "week" is 0.10725, the probability of the word "weak" is 0.069, and the probability of the word "work" is 0.0287. Accordingly, since the probability of the word "wake" is 0.405 and is highest in the second lexicon 851 of the first section 831, the artificial intelligence apparatus 820 may accurately determine the word of the first section 831 as "wake" 861.

Although the step of calibrating the frequency weight 842 in consideration of the utterance situation information is not shown in FIG. 8, the present disclosure is not limited thereto. That is, the artificial intelligence apparatus 820 may calibrate the frequency weight 842 using the utterance situation information and recognize the obtained speech data 830 using the calibrated frequency weight.

Figure 9:
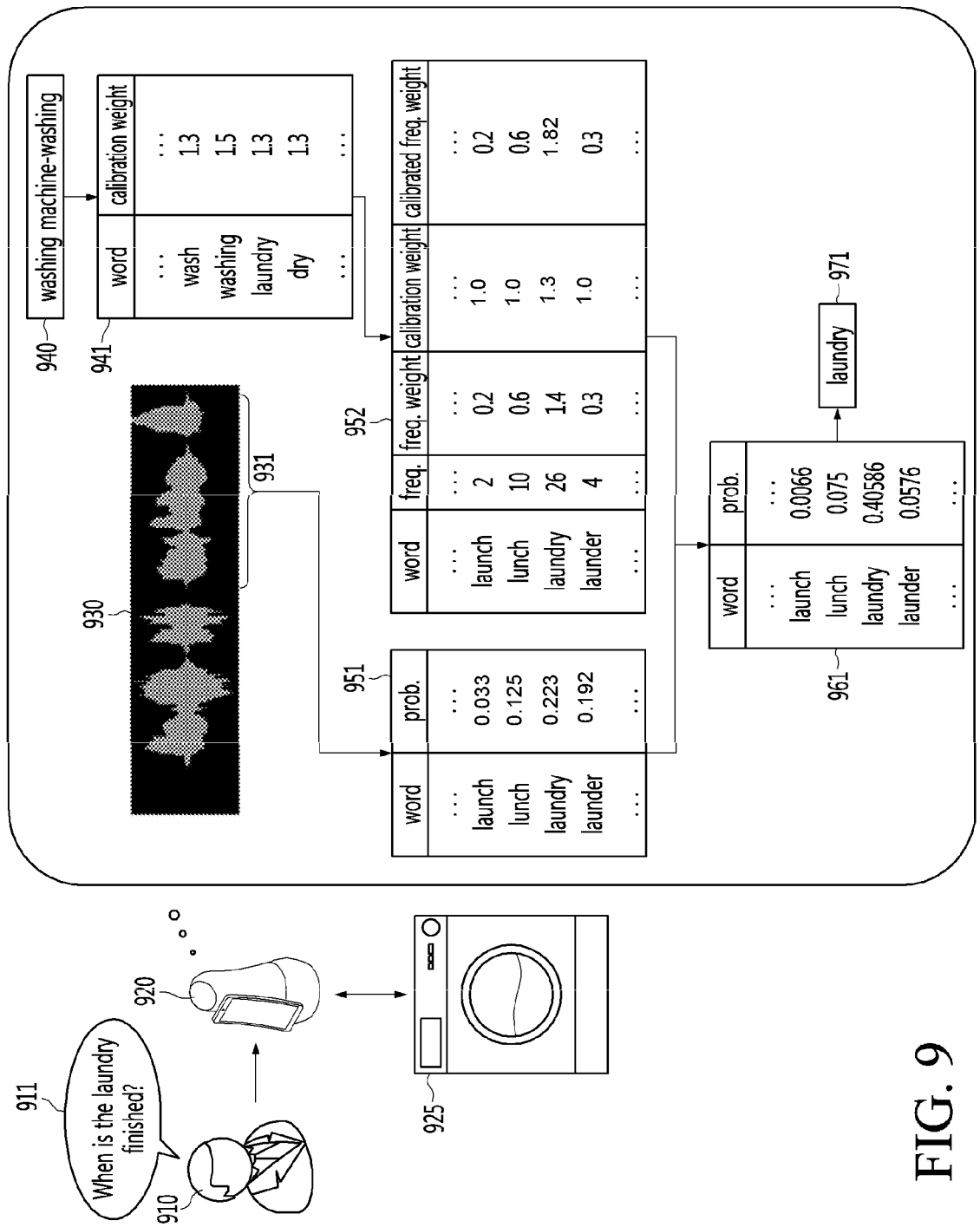
FIG. 9 is a view illustrating an example of recognizing speech of a user according to an embodiment of the present disclosure.

FIG. 9 is a view illustrating an example of recognizing speech of a user according to an embodiment of the present disclosure.

Referring to FIG. 9, when a user 910 utters "When is the laundry finished?", the artificial intelligence apparatus 920 obtains speech data 930 corresponding to the uttered speech 911 of the user 910.

The artificial intelligence apparatus 920 may obtain the utterance situation information 940 indicating that a washing machine is performing washing, by grasping the state of the washing machine 925 as an external device. In addition, the artificial intelligence apparatus 920 may determine a calibration weight 941 of words related to control of the washing machine 925 based on the utterance situation information 940. For example, according to the determined calibration weight 941, the calibration weight of a word "wash" is 1.3, the calibration weight of a word "washing" is 1.5, the calibration weight of a word "laundry" is 1.3, and the calibration weight of a word "dry" is 1.3.

The artificial intelligence apparatus 920 may determine phonemes with respect to the obtained speech data 930 using an acoustic model and determine a word from the recognized phonemes using a language model.

The artificial intelligence apparatus 920 may determine a probability 951 of each word in a first section 931 using the language model when a word of the first section 931 corresponding to "laundry" in the uttered speech 911 of the user is determined. For example, according to a first lexicon 951 of the first section 931 corresponding to "laundry", the probability of a word "launch" is 0.033, the probability of a word "lunch" is 0.125, the probability of a word "laundry" is 0.223, and the probability of a word "launder" is 0.192.

The artificial intelligence apparatus 920 may determine the usage frequency and the frequency weight 952 of each word using the speech recognition log. For example, the artificial intelligence apparatus 920 may determine the frequency weight of the word "launch" as 0.2, determine the frequency weight of the word "lunch" as 0.6, determine the frequency weight of the word "laundry" as 1.4, and determine the frequency weight of the word "launder" as 0.3.

In addition, the artificial intelligence apparatus 920 may calibrate the frequency weight using a calibration weight 941 determined using the utterance situation information 940. For example, as the result of calibration, the calibrated frequency weight of the word "launch" is 0.2, the calibrated frequency weight of the word "lunch" is 0.6, the calibrated frequency weight of the word "laundry" is 1.82, and the calibrated frequency weight of the word "launder" is 0.3.

The artificial intelligence apparatus 920 may generate a second lexicon 961 corresponding to the first section 951 in consideration of the first lexicon 951 corresponding to the first section 931 and the calibrated frequency weight 952, in order to determine the word of the first section 931. For example, according to the second lexicon 961, the probability of the word "launch" is 0.0066, the probability of the word "lunch" is 0.075, the probability of the word "laundry" is 0.40586, and the probability of the word "launder" is 0.0576. Accordingly, since the probability of the word "laundry" is 0.40586 and is highest in the second lexicon 961 of the first section 931, the artificial intelligence apparatus 920 may accurately determine the word of the first section 931 as "laundry" 971.

In the first lexicon 951 simply generated with respect to the first section 931 from the speech data 930, the probability of the word "laundry" is highest but is only 0.223. Therefore, it is difficult to guarantee accurate recognition. However, when the frequency weight considering the actual usage frequency of the word and utterance situation is used, the probability of the word "laundry" is 0.40586 and is very high. Accordingly, it can be expected that the artificial intelligence apparatus 920 accurately recognizes the speech of the first section 931 as "laundry" 971.

Although only utterance situation information based on the operation statuses of the external devices is shown in FIG. 9, the present disclosure is not limited thereto. As described above, the utterance situation information may include not only the operation statuses of the external devices but also the type of the artificial intelligence apparatus, the installation location of the artificial intelligence apparatus or the location of the uttering user. For example, if the artificial intelligence apparatus is an artificial intelligence speaker, the artificial intelligence apparatus may set the calibration weight high with respect to a word set which is frequently used to answer the question of the user.

Figure 10:
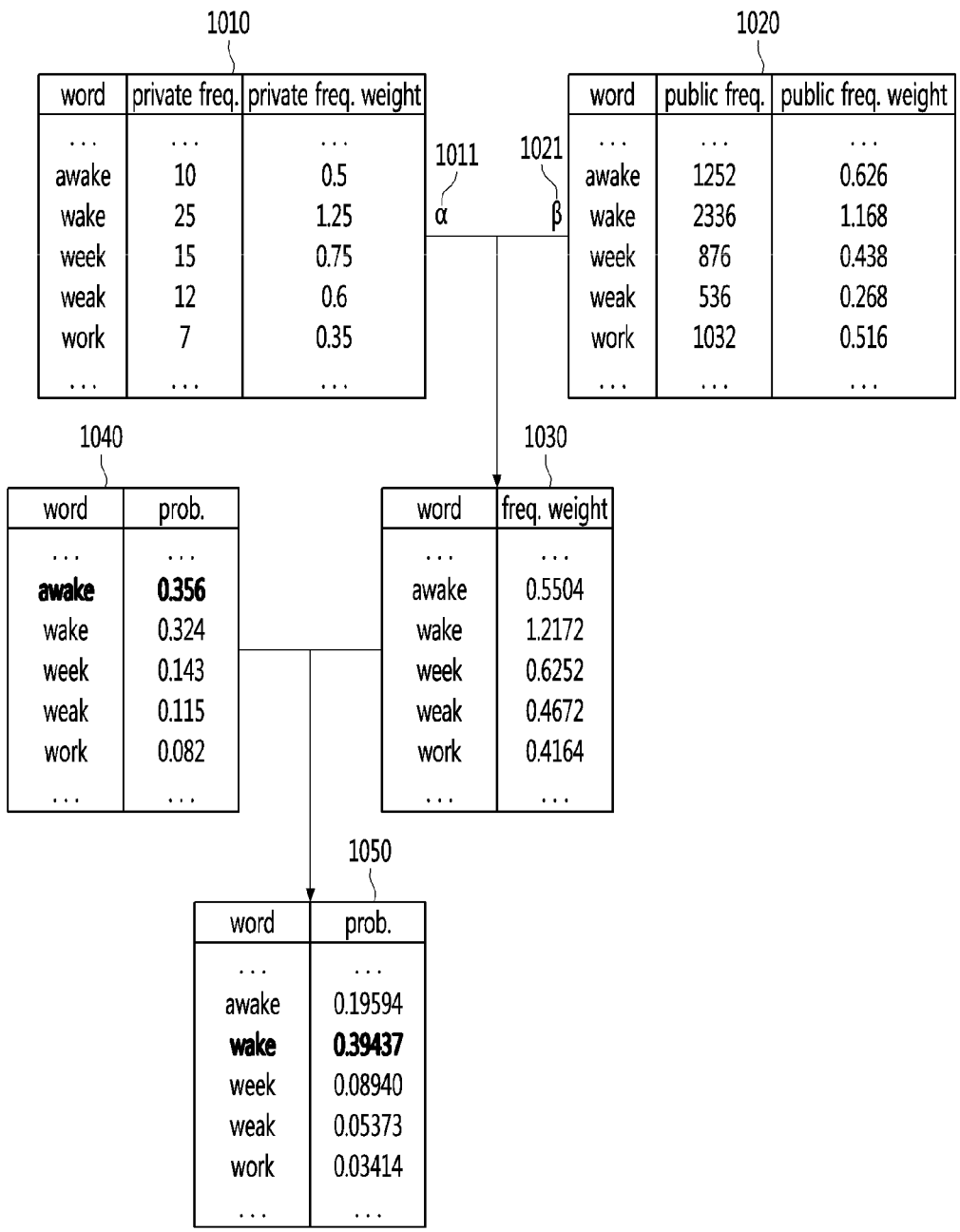
FIG. 10 is a view illustrating an example of a private frequency weight and a public frequency weight according to an embodiment of the present disclosure.

FIG. 10 is a view illustrating an example of a private frequency weight and a public frequency weight according to an embodiment of the present disclosure.

Referring to FIG. 10, the processor 180 of the artificial intelligence apparatus 100 may determine a private frequency weight or a first frequency weight 1010 from the private speech recognition log or the first speech recognition log by the user who uses the artificial intelligence apparatus 100. For example, according to the private frequency weight 1010, the private frequency weight of the word "awake" is 0.5, the private frequency weight of the word "wake" is 1.25, the private frequency weight of the word "week" is 0.75, the private frequency weight of the word "weak" is 0.6 and the private frequency weight of the word "work" is 0.35.

The processor 180 of the artificial intelligence apparatus 100 may determine a public frequency weight or a second frequency weight 1020 from the public speech recognition log or the second speech recognition log by the other users of the artificial intelligence apparatuses of the same type as the artificial intelligence apparatus 100. For example, according to the public frequency weight 1020, the public frequency weight of the word "awake" is 0.626, the public frequency weight of the word "wake" is 1.168, the public frequency weight of the word "week" is 0.438, the public frequency weight of the word "weak" is 0.268, and the public frequency weight of the word "work" is 0.516.

The artificial intelligence apparatus 100 may directly receive the speech recognition logs from external artificial intelligence apparatuses via the communication unit 110 and establish the public speech recognition log or receive the public speech recognition log from the artificial intelligence server 200 via the communication unit 110.

The processor 180 of the artificial intelligence apparatus 100 may determine an (integrated) frequency weight 1030 using the private frequency weight 1010 and the public frequency weight 1020. In one embodiment, the processor 180 may determine the (integrated) frequency weight 1030 by weighted-summing the private frequency weight 1010 and the public frequency weight 1020 using a weight α 1011 of the private frequency weight 1010 and a weight β 1021 of the public frequency weight 1020. Increasing the weight α means that the vocabulary used by the user who uses the artificial intelligence apparatus 100 is highly valued. For example, according to the (integrated) frequency weight 1030 determined when the weight α 1011 is 0.6 and the weight β 1021 is 0.4, the (integrated) frequency weight of the word "awake" is 0.5504, the (integrated) frequency weight of the word "wake" is 1.2172, the (integrated) frequency weight of the word "week" is 0.6252, the (integrated) frequency weight of the word "weak" is 0.4672, and the (integrated) frequency weight of the word ""work" is 0.4164.

The weight α 1011 and the weight β 1021 used to weighted-summing the private frequency weight 1010 and the public frequency weight 1020 may be set in advance and may be set by user input.

The processor 180 of the artificial intelligence apparatus 100 may generate a calibrated lexicon 1050 by calibrating the lexicon 1040 using the determined (integrated) frequency weight 1030. Specifically, the processor 180 may generate the calibrated lexicon 1050 by correspondingly multiplying the probabilities of the words included in the lexicon 1040 by the word-by-word frequency weight included in the determined (integrated) frequency weight 1030. For example, if it is assumed that the probability of the word "awake" is 0.356, the probability of the word "wake" is 0.324, the probability of the word "week" is 0.143, the probability of the word "weak" is 0.115, and the probability of the word "work" is 0.082 in the lexicon 1040, the probability of the word "awake" is 0.19594, the probability of the word "wake" is 0.39437, the probability of the word "week" is 0.08940, the probability of the word "weak" is 0.05373, and the probability of the word "work" is 0.03414 in the calibrated lexicon 1050. According to the first lexicon 1040, since the probability of the word "awake" in the target section of the speech data is highest, if the usage frequency of the word is not considered, the processor 180 determines the word of the target section as "awake". However, if the usage frequency of the word is considered, since the probability of the word "wake" is highest in the calibrated lexicon 1050, the processor 180 may determine the word of the target section as "wake".

According to various embodiments, by giving high weights to words frequently used by a user, it is possible to increase a recognition rate of the frequently used words and to perform personalized speech recognition of each user.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus for recognizing speech of a user, comprising:
 a microphone; and
 a processor configured to:
  obtain, via the microphone, speech data including speech of a user,
  for each of a plurality of sections of the speech data:
   calculate a probability for each of a plurality of words,
   determine, using a speech recognition log, a frequency weight for each of the plurality of words,
   for each of the plurality of words, calibrate the probability by multiplying the calculated probability by the determined frequency weight,
  convert the speech data into text by (i) selecting, for each section of the plurality of sections, a word having a highest calibrated probability and (ii) combining the selected words, and
  perform control based on the text.

2. The artificial intelligence apparatus of claim 1, wherein the processor is configured to:
 normalize the calibrated probabilities, and
 convert the speech data into the text by selecting, for each section of the plurality of sections, a word having a highest normalized calibrated probability.

3. The artificial intelligence apparatus of claim 1, wherein the processor is configured to:
 check a usage frequency of a word using the speech recognition log, and
 set, based on usage frequencies of words, a frequency weight of a word to be higher than a frequency weight of another word.

4. The artificial intelligence apparatus of claim 3, wherein the processor is configured to:
 determine a private frequency weight for a word using a private speech recognition log,
 determine a public frequency weight for a word using a public speech recognition log, and
 calibrate a probability for a word using the private frequency weight and the public frequency weight,
 wherein the private speech recognition log includes speech recognition logs in the artificial intelligence apparatus, and
 wherein the public speech recognition log includes speech recognition logs in an external apparatus.

5. The artificial intelligence apparatus of claim 4, wherein the processor is configured to:
 determine an integrated frequency weight by calculating a weighted sum of a private frequency weight of a word and a public frequency weight of a word, and
 calibrate a probability using the integrated frequency weight.

6. The artificial intelligence apparatus of claim 1, wherein the processor is configured to:
 determine utterance situation information corresponding to an utterance situation, and
 calibrate a frequency weight for a word using the utterance situation information.

7. The artificial intelligence apparatus of claim 6,
 wherein the utterance situation information includes at least one of a type of the artificial intelligence apparatus, an installation location of the artificial intelligence apparatus, a location of the user, a main user, and a device operation status, and
 wherein the device operation status includes operation status information of the artificial intelligence apparatus.

8. The artificial intelligence apparatus of claim 7, further comprising a communication circuit configured to communicate with at least one external device,
 wherein the device operation status further includes operation status information of the at least one external device.

9. The artificial intelligence apparatus of claim 8, wherein the processor is configured to:
 determine a calibration weight based on the utterance situation information, and
 calibrate a frequency weight by multiplying a frequency weight by the calibration weight.

10. A computer-implemented method of recognizing speech of a user, the method comprising:
 obtaining, via a microphone, speech data including speech of a user,
 for each of a plurality of sections of the speech data:
  calculating a probability for each of a plurality of words,
  determining, using a speech recognition log, a frequency weight for each of the plurality of words,
  for each of the plurality of words, calibrating the probability by multiplying the calculated probability by the determined frequency weight,
 converting the speech data into text by (i) selecting, for each section of the plurality of sections, a word having a highest calibrated probability and (ii) combining the selected words, and
 performing control based on the text.

11. The computer-implemented method of claim 10, further comprising:
 normalizing the calibrated probabilities, and
 converting the speech data into the text by selecting, for each section of the plurality of sections, a word having a highest normalized calibrated probability.

12. The computer-implemented method of claim 10, further comprising:
 checking a usage frequency of a word using the speech recognition log, and
 setting, based on usage frequencies of words, a frequency weight of a word to be higher than a frequency weight of another word.

13. The computer-implemented method of claim 12, further comprising:
 determining a private frequency weight for a word using a private speech recognition log,
 determining a public frequency weight for a word using a public speech recognition log, and
 calibrating a probability for a word using the private frequency weight and the public frequency weight,
 wherein the private speech recognition log includes speech recognition logs in an artificial intelligence apparatus, and
 wherein the public speech recognition log includes speech recognition logs in an external apparatus.

14. The computer-implemented method of claim 13, further comprising:

determining an integrated frequency weight by calculating a weighted sum of a private frequency weight of a word and a public frequency weight of a word, and calibrating a probability using the integrated frequency weight.

15. The computer-implemented method of claim 10, further comprising:

determining utterance situation information corresponding to an utterance situation, and calibrating a frequency weight for a word using the utterance situation information.

16. The computer-implemented method of claim 15, wherein the utterance situation information includes at least one of a type of an artificial intelligence apparatus, an installation location of the artificial intelligence apparatus, a location of the user, a main user, and a device operation status, and wherein the device operation status includes operation status information of the artificial intelligence apparatus.

17. The computer-implemented method of claim 10, further comprising:

determining a calibration weight based on utterance situation information, and calibrating a frequency weight by multiplying a frequency weight by the calibration weight.

18. A non-transitory processor-readable medium having recorded a program for performing a method of recognizing speech of a user, the method comprising:

obtaining, via a microphone, speech data including speech of a user, for each of a plurality of sections of the speech data:

calculating a probability for each of a plurality of words, determining, using a speech recognition log, a frequency weight for each of the plurality of words, for each of the plurality of words, calibrating the probability by multiplying the calculated probability by the frequency weight, converting the speech data into text by (i) selecting, for each section of the plurality of sections, a word having a highest calibrated probability and (ii) combining the selected words, and performing control based on the text.

* * * * *